US012811273B2

(12) United States Patent
Fang et al.

(10) Patent No.: US 12,811,273 B2
(45) Date of Patent: Nov. 24, 2026

(54) CONDUCTIVE ELASTIC COMPONENT AND ELECTRONIC DEVICE

(71) Applicant: PEGATRON CORPORATION, Taipei City (TW)

(72) Inventors: Chi-Yin Fang, Taipei City (TW); Chih-Wei Liao, Taipei City (TW); Chao-Hsu Wu, Taipei City (TW); Sao-Hua Huang, Taipei City (TW); Chi-Yao Huang, Taipei City (TW); Shih-Keng Huang, Taipei City (TW); Hau Yuen Tan, Taipei City (TW); Hao-Hsiang Yang, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 47 days.

(21) Appl. No.: 18/972,743

(22) Filed: Dec. 6, 2024

(65) Prior Publication Data

US 2025/0329913 A1 Oct. 23, 2025

(30) Foreign Application Priority Data

Apr. 22, 2024 (TW) ................................ 113114963

(51) Int. Cl.
*H01Q 1/22* (2006.01)

(52) U.S. Cl.
CPC .................................... *H01Q 1/22* (2013.01)

(58) Field of Classification Search
CPC ............... H01Q 1/22; H01Q 1/44; H01Q 9/42
See application file for complete search history.

(56) References Cited

U.S. PATENT DOCUMENTS

| | | | | |
|---|---|---|---|---|
| 2009/0110876 A1* | 4/2009 | Chang | H01R 12/57 | 428/119 |
| 2014/0132460 A1* | 5/2014 | Cho | H01Q 21/28 | 343/702 |
| 2019/0326692 A1* | 10/2019 | Lin | H01R 12/707 | |
| 2022/0407218 A1* | 12/2022 | Guo | H01Q 9/42 | |

FOREIGN PATENT DOCUMENTS

| | | |
|---|---|---|
| CN | 208111654 | 11/2018 |
| CN | 212434860 | 1/2021 |
| CN | 218101743 U * | 12/2022 |
| CN | 218275067 | 1/2023 |
| CN | 220106870 | 11/2023 |

OTHER PUBLICATIONS

CN218101743U_Machine_Translation (Year: 2022).*
CN218275067U_Machine_Translation (Year: 2023).*

* cited by examiner

*Primary Examiner* — Michael M Bouizza
(74) *Attorney, Agent, or Firm* — J.C. PATENTS

(57) ABSTRACT

A conductive elastic component includes a fixing portion and a bent extension portion. The fixing portion includes a first section, a second section, and a third section that are bent and connected in sequence, and the first section corresponds to the third section. The bent extension portion extends from the fixing portion and includes a fourth section, a fifth section, and a sixth section that are bent and connected in sequence. The fourth section is connected to the second section, and the sixth section bends towards the fixing portion, such that the sixth section is located between the fourth section and the fifth section. The sixth section is adapted to abut the fourth section or the second section.

13 Claims, 9 Drawing Sheets

CONDUCTIVE ELASTIC COMPONENT AND ELECTRONIC DEVICE

CROSS-REFERENCE TO RELATED APPLICATION

This application claims the priority benefit of Taiwan application Ser. No. 113114963, filed on Apr. 22, 2024. The entirety of the above-mentioned patent application is hereby incorporated by reference herein and made a part of this specification.

BACKGROUND

Technology Field

The disclosure relates to a conductive elastic component and an electronic device, and particularly relates to a conductive elastic component that may connect an antenna located on a carrier to a metal frame and an electronic device having the conductive elastic component.

Description of Related Art

With the advancement of technology, electronic devices have developed narrow frame designs to enhance aesthetics. In a conventional electronic device, the antenna is currently connected to the metal frame through screws to achieve a grounding effect. However, the design requires disposing screw seats for screw fastening in the frame border area of the electronic device, which consumes the limited remaining space within the frame border area.

SUMMARY

The disclosure provides a conductive elastic component and an electronic device having the same. The conductive elastic component is adapted to connect an antenna located on a carrier to a metal frame. The frame border area does not need to be provided with an additional structure for fixing the conductive elastic component, which significantly saves space in the frame border area.

A conductive elastic component of the disclosure includes a fixing portion and a bent extension portion. The fixing portion includes a first section, a second section, and a third section. The first section, the second section, and the third section are bent and connected in sequence, and the first section corresponds to the third section. The bent extension portion extends from the fixing portion and includes a fourth section, a fifth section, and a sixth section. The fourth section, the fifth section, and the sixth section are bent and connected in sequence. The fourth section is connected to the second section, and the sixth section bends towards the fixing portion, such that the sixth section is located between the fourth section and the fifth section. The sixth section is adapted to abut the fourth section or the second section.

In an embodiment of the disclosure, the bent extension portion includes a groove located between the fourth section and the fifth section.

In an embodiment of the disclosure, a width of the bent extension portion is between 0.7 millimeters (mm) and 2 mm.

In an embodiment of the disclosure, the fourth section extends in a direction away from a plane where the first section is located, the fifth section extends in a direction towards the plane where the first section is located, and a projection of the fifth section on the plane where the first section is located is outside the first section.

In an embodiment of the disclosure, one of the first section and the third section includes a clamping section, and the clamping section bends towards the other of the first section and the third section.

In an embodiment of the disclosure, a minimum distance between the clamping section and one of the first section and the third section is 0.6 mm to 0.8 mm.

An electronic device of the disclosure includes a metal frame, a carrier, an antenna, and a conductive elastic component. The carrier is adjacent to the metal frame. The antenna is disposed at the carrier. The conductive elastic component includes a fixing portion and a bent extension portion. The fixing portion includes a first section, a second section, and a third section. The first section, the second section, and the third section are bent and connected in sequence, and the first section corresponds to the third section. The bent extension portion extends from the fixing portion and includes a fourth section, a fifth section, and a sixth section. The fourth section, the fifth section, and the sixth section are bent and connected in sequence. The fourth section is connected to the second section, and the sixth section bends towards the fixing portion, such that the sixth section is located between the fourth section and the fifth section. The sixth section is adapted to abut the fourth section or the second section. The conductive elastic component is disposed between the carrier and the metal frame. At least one of the first section and the third section of at least one conductive elastic component is fixed to the carrier, the first section or the third section contacts the antenna, and the bent extension portion connects to the metal frame.

In an embodiment of the disclosure, the at least one conductive elastic component includes multiple conductive elastic components, and a distance between any two adjacent conductive elastic components among these conductive elastic components is less than 15 mm.

In an embodiment of the disclosure, one of the first section and the third section includes a first positioning portion, and the carrier includes a second positioning portion corresponding to the first positioning portion.

In an embodiment of the disclosure, one of the first positioning portion and the second positioning portion is a protrusion, and the other of the first positioning portion and the second positioning portion is a hole, and the protrusion is adapted to be fixed in the hole.

Based on the above, the first section, second section, and third section of the fixing portion of the conductive elastic component of the electronic device of the disclosure are bent in sequence, and the first section corresponds to the third section. The fourth section, the fifth section, and the sixth section of the bent extension portion are bent in sequence, the fourth section is connected to the second section, and the sixth section bends towards the fixing portion, such that the sixth section is located between the fourth section and the fifth section. The sixth section is adapted to abut the fourth section or the second section. The conductive elastic component of the disclosure may be fixed to the carrier by at least one of the first section and the third section. The frame border area of the electronic device does not need to be provided with an additional structure for fixing the conductive elastic component, such as screw seats, which significantly saves space in the frame border area.

DESCRIPTION OF THE EMBODIMENTS

Figure 1:
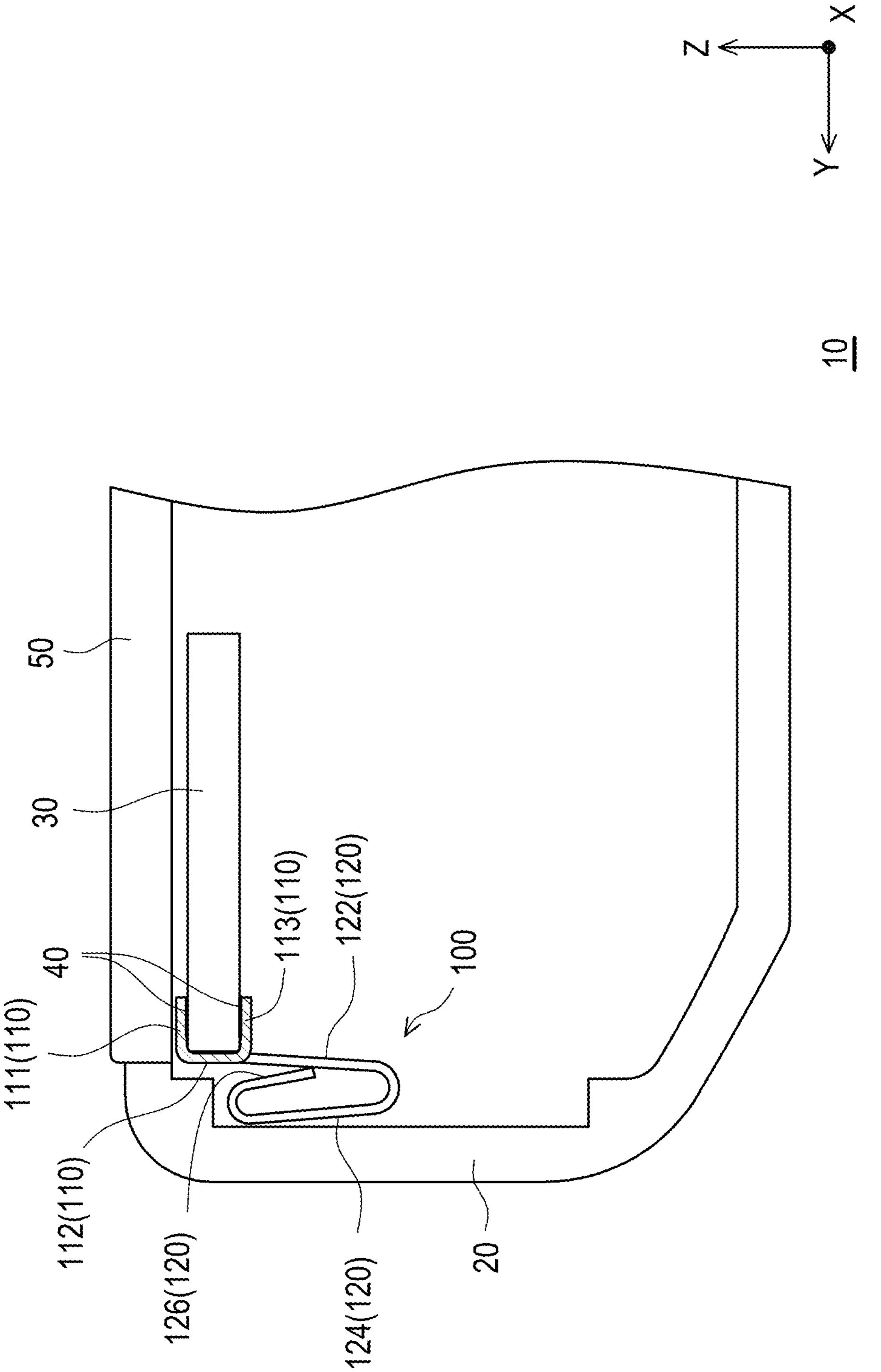
FIG. 1 is a partial cross-sectional schematic view of an electronic device according to an embodiment of the disclosure.

FIG. 1 is a partial cross-sectional schematic view of an electronic device according to an embodiment of the disclosure. It should be noted that FIG. 1 illustrates the frame border area of the electronic device. For clarity, merely the elements described in the case are illustrated, while other elements are hidden.

Referring to FIG. 1, an electronic device 10 of the embodiment includes a metal frame 20, a carrier 30, an antenna 40, and a conductive elastic component 100. The electronic device 10 may be, for example, a laptop computer, a tablet computer, or a mobile phone, but the type of electronic device is not limited thereto.

The carrier 30 is below a cover plate 50, and adjacent to the metal frame 20. The carrier 30 may be, for example, a circuit board for the antenna 40, but the type of carrier 30 is not limited thereto. The antenna 40 is disposed at the carrier 30, for example, located at the upper surface or lower surface of the carrier 30. The antenna 40 is exemplified by a WiFi 2.4 GHz antenna, but the position and type of the antenna 40 on the carrier 30 are not limited thereto. The conductive elastic component 100 is disposed between the carrier 30 and the metal frame 20 to connect the antenna 40 to the metal frame 20.

Figure 2:
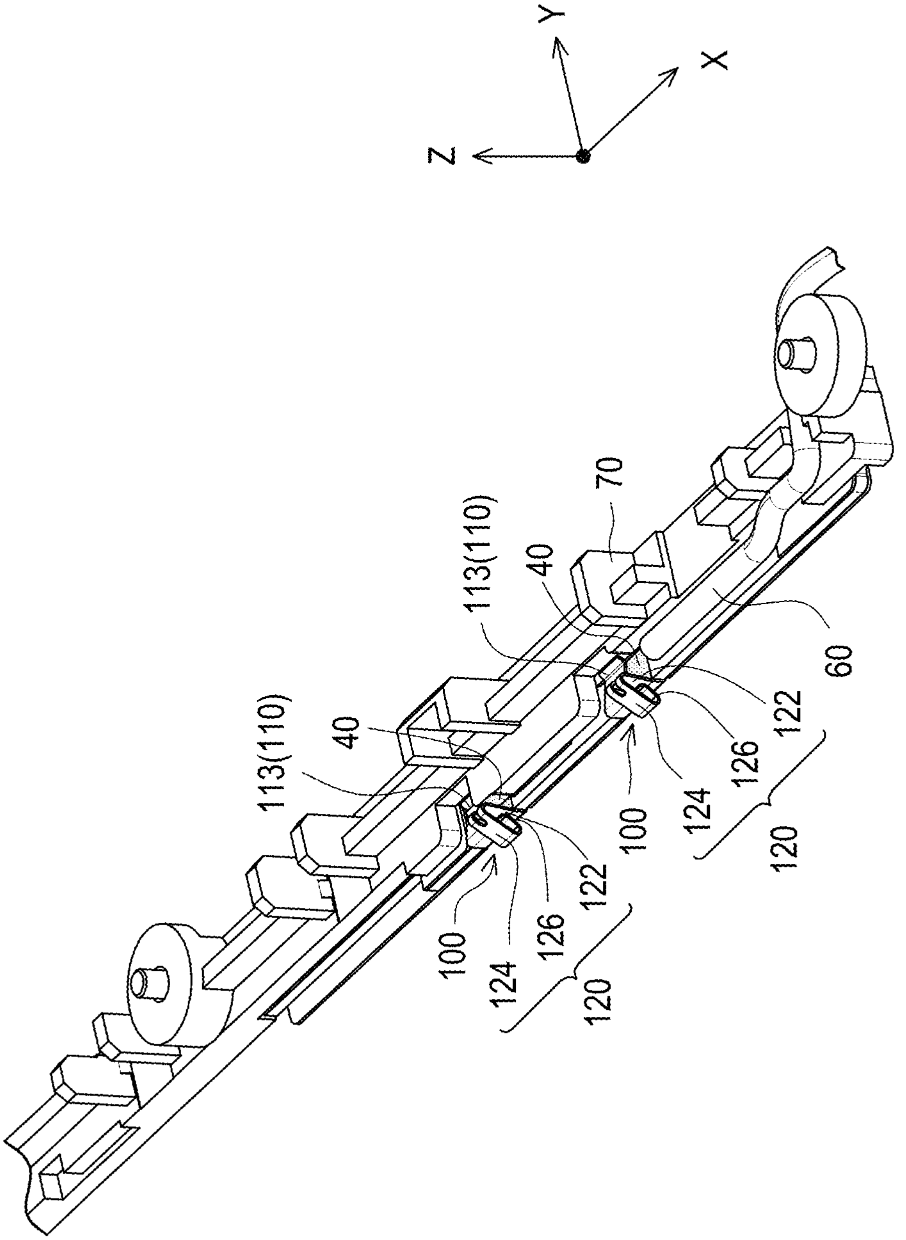
FIG. 2 and FIG. 3 are schematic views of the carrier, antenna, conductive elastic component, plastic bracket, and coaxial transmission line of the electronic device in FIG. 1 from different angles.
Figure 3:
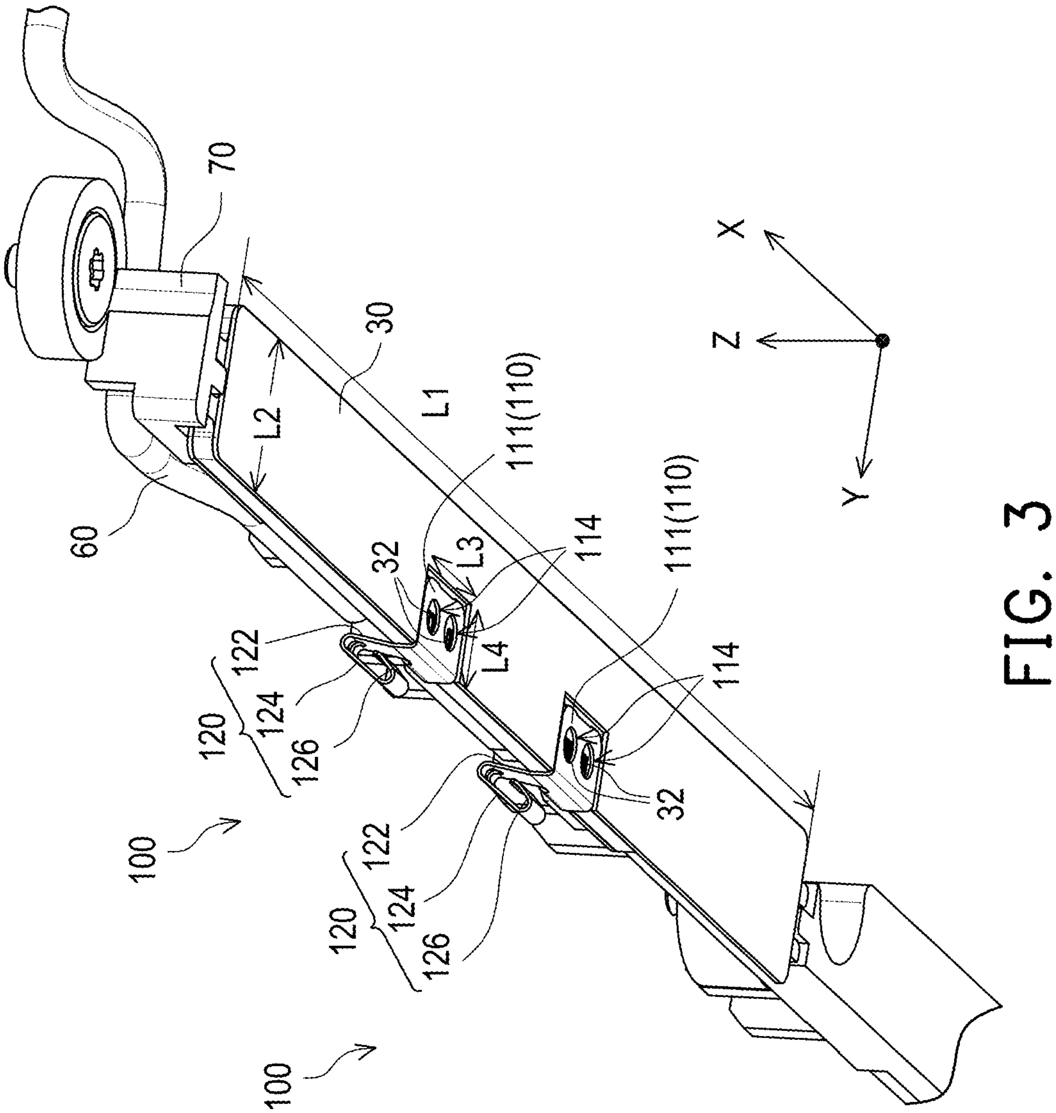

FIG. 2 and FIG. 3 are schematic views of the carrier, antenna, conductive elastic component, plastic bracket, and coaxial transmission line of the electronic device in FIG. 1 from different angles. It should be noted that since a part of the antenna 40 in FIG. 2 is obscured by a plastic bracket 70, the antenna 40 is represented by dotted lines for clear display.

Referring to FIG. 2 and FIG. 3, in the embodiment, the carrier 30 and a coaxial transmission line 60 are disposed at the plastic bracket 70, and the coaxial transmission line 60 is electrically connected to the antenna 40. In the embodiment, two conductive elastic components 100 are disposed at the carrier 30, and exposed at the edge of the plastic bracket 70 and the carrier 30.

As shown in FIG. 3, in the embodiment, the carrier 30 has a length L1 and a width L2. The length L1 of the carrier 30 may be, for example, 50 millimeters (mm), and the width L2 may be, for example, 4.5 mm. The portion of the conductive elastic component 100 connected to the carrier 30 has a length L3 and a width L4. The length L3 may be, for example, 3.4 mm, and the width LA may be, for example, 2.2 mm, but the dimensions are not limited thereto.

Figure 4:
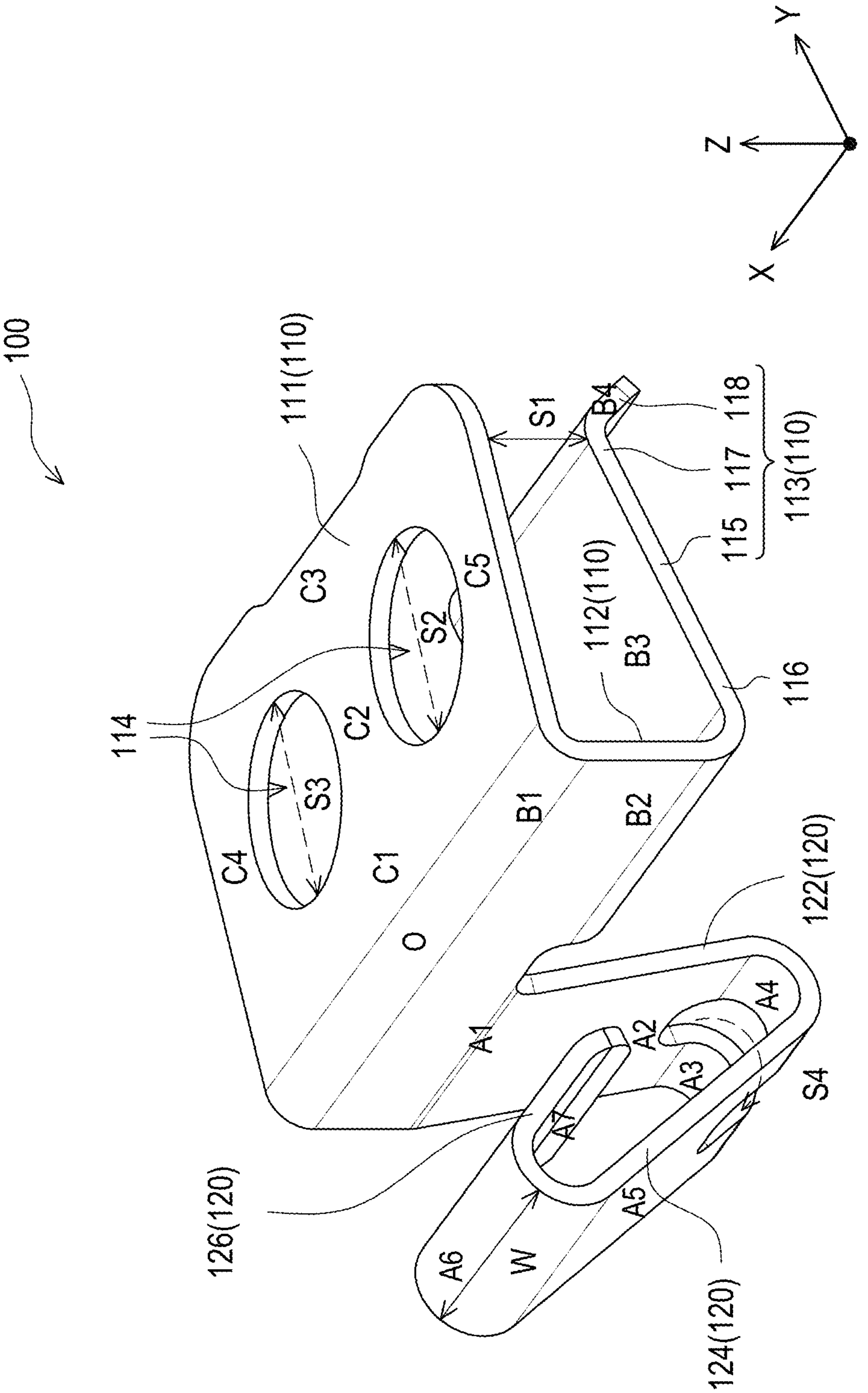
FIG. 4 is a perspective schematic view of the conductive elastic component in FIG. 1.
Figure 5:
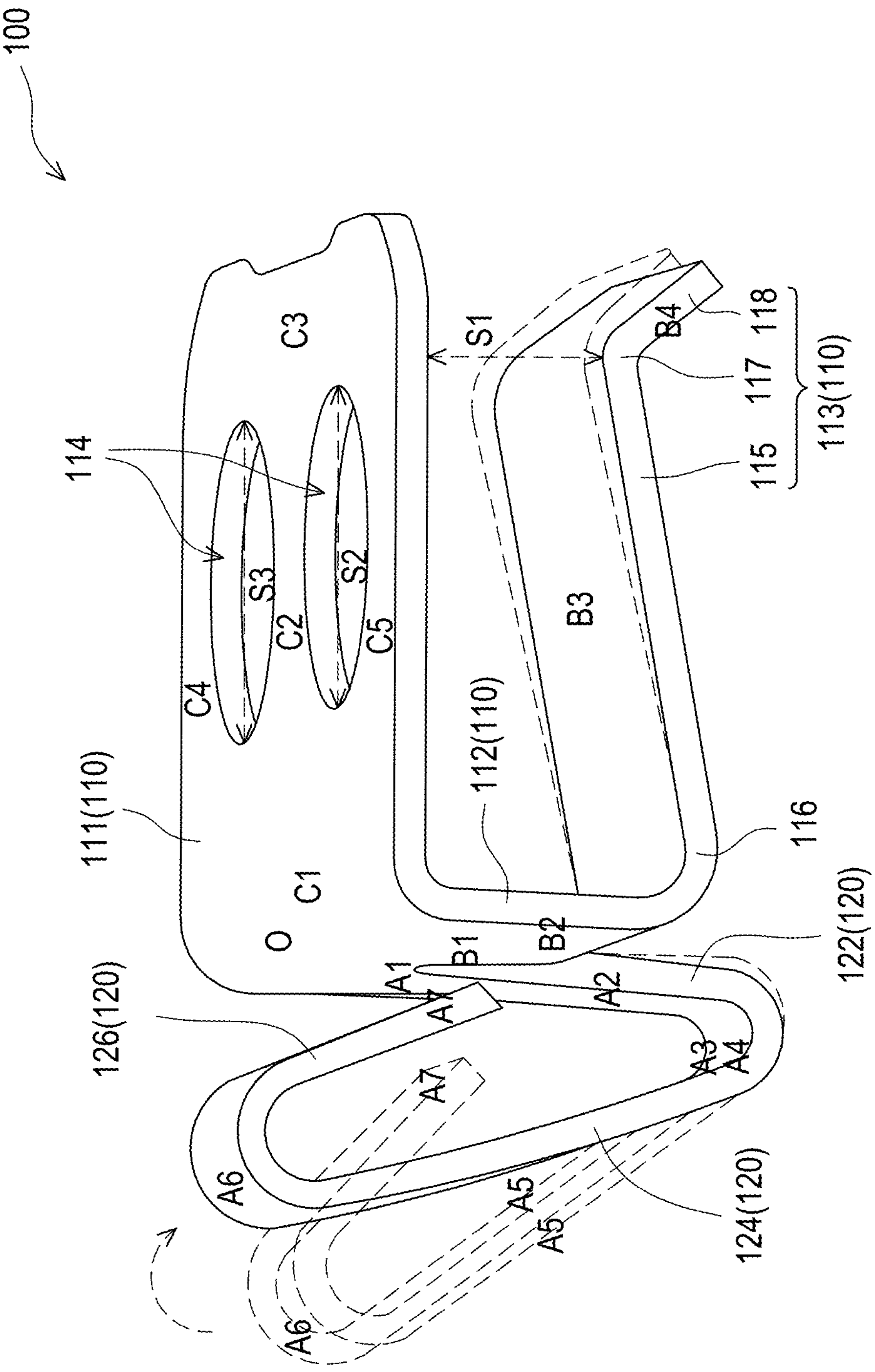
FIG. 5 is a schematic view of the conductive elastic component in FIG. 1 before and after deformation.

FIG. 4 is a perspective schematic view of the conductive elastic component in FIG. 1. FIG. 5 is a schematic view of the conductive elastic component in FIG. 1 before and after deformation. It should be noted that FIG. 5 schematically illustrates the conductive elastic component 100 before deformation with dashed lines, and the conductive elastic component 100 after deformation with solid lines.

Referring to FIG. 4 and FIG. 5, the conductive elastic component 100 of the embodiment includes a fixing portion 110 and a bent extension portion 120. The fixing portion 110 includes a first section 111 (positions C1 to C5), a second section 112 (positions O, B1, and B2), and a third section 113 (positions B3 and B4). The first section 111, the second section 112, and the third section 113 are bent and connected in sequence, and the first section 111 corresponds to the third section 113. At least one of the first section 111 and the third section 113 is adapted to be fixed to the carrier 30 (FIG. 2 and FIG. 3). In the embodiment, the fixing portion 110 is a clamping component, and the first section 111 and the third section 113 are adapted to jointly clamp the carrier 30.

The first section 111 or the third section 113 of the fixing portion 110 is adapted to contact the antenna 40. As shown in FIG. 1, in the embodiment, both the first section 111 and the third section 113 contact the antenna 40.

As shown in FIG. 3 and FIG. 4, one of the first section 111 and the third section 113 includes a first positioning portion 114, and the carrier 30 includes a second positioning portion 32 corresponding to the first positioning portion 114. One of the first positioning portion 114 and the second positioning portion 32 is a protrusion, and the other of the first positioning portion 114 and the second positioning portion 32 is a hole. The protrusion is adapted to be fixed in the hole.

Specifically, in the embodiment, the first section 111 has the first positioning portion 114, and the first positioning portion 114 is a hole. The second positioning portion 32 of the carrier 30 is a protrusion that extends into the hole. The number of first positioning portions 114 is exemplified by two, and diameters S2 and S3 of the two first positioning portions 114 may be, for example, 1 millimeter, but are not limited thereto. The first positioning portion 114 and the second positioning portion 32 are also not limited to being holes or protrusions.

Moreover, as shown in FIG. 4, one of the first section 111 and the third section 113 includes a clamping section. The clamping section bends towards the other of the first section 111 and the third section 113. Specifically, the first section 111 or the third section 113 without having the first positioning portion 114 includes a clamping section. In the embodiment, the third section 113 that does not have the first positioning portion 114 includes the clamping section, the clamping section bends towards the first section 111 having the first positioning portion 114.

Specifically, the clamping section includes a first part 115 and a second part 118, and the first part 115 and the second part 118 are bent and connected. The first part 115 includes a first end 116 and a second end 117 opposite to each other, the first end 116 is connected to the second section 112, and the second end 117 is connected to the second part 118. The second end 117 is adapted to abut the carrier 30. There exists a minimum distance S1 between the second end 117 and the first section 111.

A minimum distance between the clamping section and one of the first section 111 and the third section 113 is between 0.6 mm and 0.8 mm. In the embodiment, there exists the minimum distance S1 between the second end 117 of the first part 115 of the third section 113 and the first section 111 having the first positioning portion 114. The minimum distance S1 is exemplified to be between 0.6 mm and 0.8 mm, but is not limited thereto. Such the configuration may allow the fixing portion 110 to have a better clamping force, providing a stable fixing effect.

In addition, in the embodiment, in addition to being fixed to the carrier 30 by the clamping method through the first section 111 and the third section 113 of the fixing portion 110, the conductive elastic component 100 may further be fixed to the carrier 30 by welding the first section 111, so that the conductive elastic component 100 may be more securely fixed to the carrier 30.

The method for fixing the conductive elastic component 100 to the carrier 30 is not limited thereto. In other embodiments, the conductive elastic component 100 may also be fixed to the carrier 30 without using the clamping method, and may be directly fixed to the carrier 30 by methods such as welding, snap-fitting, or adhesive bonding.

It is worth mentioning that as the conductive elastic component 100 in the embodiment may be fixed to the carrier 30 by a clamping method or welding method, the conductive elastic component 100 has the advantages of movable adjustment, high degree of freedom, and flexible selection of the optimal position. A designer may change the position of the conductive elastic component 100 on the carrier 30 and the position at which the conductive elastic component 100 connects to the metal frame 20 to find the optimized configuration, such that the advantages of simpler design structure and easier adjustment of impedance matching can be achieved.

Moreover, the bent extension portion 120 extends from the second section 112 (position O) of the fixing portion 110, for connecting to the metal frame 20 (FIG. 1). The bent extension portion 120 includes a fourth section 122 (positions A1 to A4), a fifth section 124 (positions A5 to A6), and a sixth section 126 (positions A6 to A7). The fourth section 122, the fifth section 124, and the sixth section 126 are bent and connected in sequence. The fourth section 122 is connected to the second section 112, and the sixth section 126 bends towards the fixing portion 110, such that the sixth section 126 is located between the fourth section 122 and the fifth section 124. The sixth section 126 is adapted to abut the fourth section 122 or the second section 112.

The fourth section 122 extends in a direction away from the plane where the first section 111 is located (for example, towards the direction opposite to the Z direction of FIG. 4). The plane where the first section 111 is located refers to the plane in which the first section 111 extends outward. The fifth section 124 extends in a direction towards the plane where the first section 111 is located (for example, towards the upper left of FIG. 4). The projection of the fifth section 124 on the plane where the first section 111 is located is outside the first section 111. In the embodiment, the overall appearance of the conductive elastic component 100 may present a double C-shaped structure.

In the embodiment, the conductive elastic component 100 may first be fixed to the carrier 30 through the fixing portion 110 to connect with the antenna 40, and the shape of the bent extension portion 120 may allow the conductive elastic component 100 together with the carrier 30 to be placed into the metal frame 20. When such a situation occurs, the bent extension portion 120 may be pushed and deformed by the metal frame 20, enabling the bent extension portion 120 to be smoothly put into the metal frame 20. Thus, quite convenient for assembly can be achieved, and the requirement for straight-up and straight-down assembly of an automated production line is satisfied.

As shown in FIG. 1 and FIG. 5 (solid lines), when the bent extension portion 120 is pushed and deformed by the metal frame 20 and connects to the metal frame 20 (FIG. 1), the sixth section 126 abuts the fourth section 122 or the second section 112. The position A6 of the sixth section contacts the metal frame 20 with a linear manner (as shown FIG. 1). The antenna 40 may connect to the metal frame 20 through the positions B3, B2, B1, A1, and A6 of the conductive elastic component 100 to achieve the shortest path for current. Such a design, on one hand, may satisfy the effect of convenient assembly and good connection to the metal frame 20, and on the other hand, may provide the shorter current path than the entire bent extension portion 120, having the characteristic of shortening the equivalent current path design to improve performance.

Moreover, when the conductive elastic component 100 is connected to the metal frame 20, the bent extension portion 120 is laterally pressed against the metal frame 20 (such as the metal side wall), the forced direction of the bent extension portion 120 is in the Y direction. Thus, the impact on Z-axis waviness during the assembly of the entire device can be reduced. In addition, the conductive elastic component 100 may be used in a very small space with a Y-axis space of less than 2.5 mm, and may be applied to the electronic device 10 with an ultra-narrow frame.

In the embodiment, the width of the bent extension portion 120 is between 0.7 mm and 2 mm. More specifically, a width W (as shown in FIG. 4) of the portion of the bent extension portion 120 that connects to the metal frame 20 (position A6) is between 0.7 mm and 2 mm, to achieve a good connection effect. In a more exemplary embodiment, the width W is between 1 mm and 1.5 mm.

Additionally, the bent extension portion 120 includes a groove S4 located between the fourth section 122 and the fifth section 124. The groove may allow the fourth section 122 and the fifth section 124 to deform more easily to enhance the smoothness of deformation of the bent extension portion 120.

Figure 6:
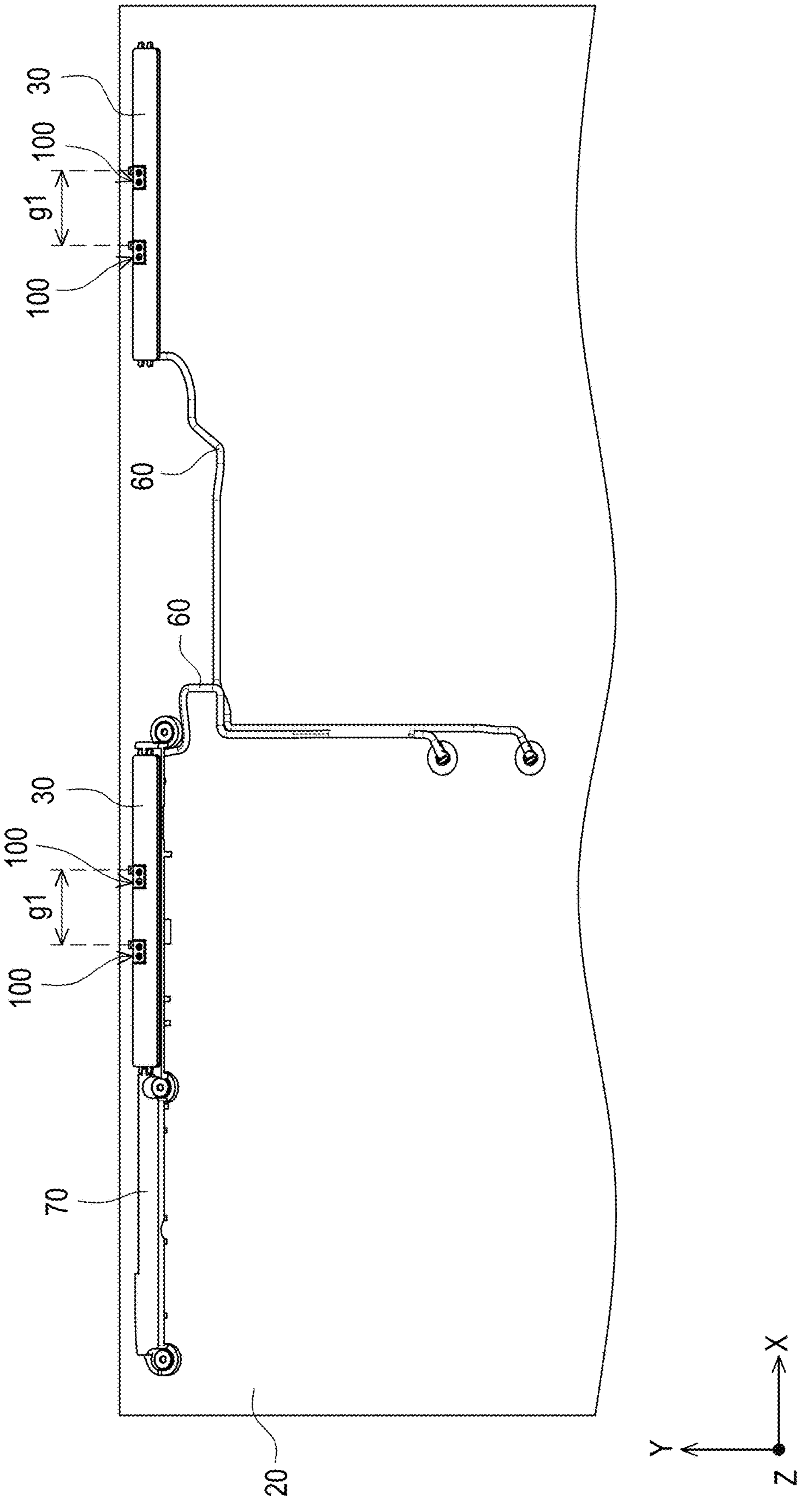
FIG. 6 is a top view schematic diagram of two sets of carriers, conductive elastic components, and coaxial transmission lines in the electronic device of FIG. 1.

FIG. 6 is a top view schematic diagram of two sets of carriers, conductive elastic components, and coaxial transmission lines in the electronic device of FIG. 1. Referring to FIG. 6, in the embodiment, the electronic device 10 is provided with two modules, and each of the modules has the carrier 30, the antenna 40 (FIG. 1), the conductive elastic component 100, and the coaxial transmission line 60. The carrier 30 on the left side of FIG. 6 is assembled with the plastic bracket 70 on the metal frame 20, and the carrier 30 on the right side of FIG. 6 may be assembled on the plastic bone structure (not shown) of the metal frame 20. The two coaxial transmission lines 60 of the two modules connect RF signals to the module card (not shown) on the main board (not shown).

The number of conductive elastic components 100 on the carrier 30 of each of the modules may be, for example, two. A distance g1 between the two conductive elastic components 100 is less than 15 mm, for example, 10 mm, but is not limited thereto. In other embodiments, the number of conductive elastic components 100 may also be greater than two, for example, three, in which case the distance between any two adjacent conductive elastic components 100 is less than 15 mm.

If the distance g1 between the two conductive elastic components 100 is between 10 mm and 15 mm, a ground plane equivalent to a width of approximately 10 mm to 15 mm may be produced, thereby improving the grounding effect. The required width of the ground plane is related to the frequency band of the antenna 40. For example, if the frequency band of the antenna 40 is WiFi 2.4 GHz, the required width of the ground plane, which is the distance g1, is approximately between 10 mm and 15 mm. If the frequency band of the antenna 40 is 800 MHZ, for example, the required width of the ground plane is approximately 45 mm. To prevent the distance g1 between two adjacent conductive elastic components 100 from being too far, three conductive elastic components 100 may be provided on the carrier 30, and the distance g1 between two adjacent conductive elastic components 100 is approximately 15 mm.

Figure 7:
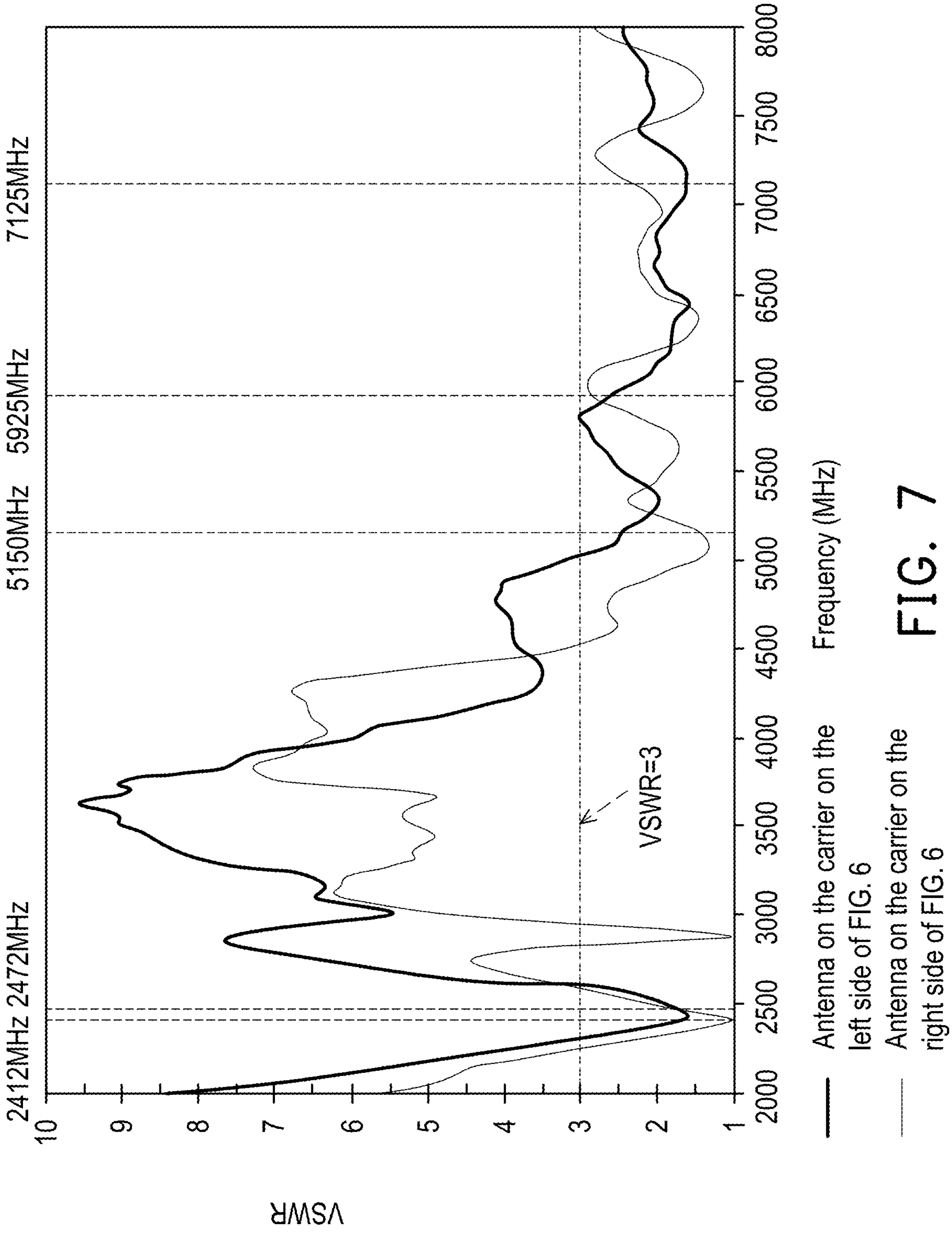
FIG. 7 is a frequency-VSWR relationship diagram of the antennas on the two sets of carriers in the electronic device of FIG. 1.

The location of the conductive elastic components 100 may allow the two antennas 40 of the two modules to have good performance. Specifically, FIG. 7 is a frequency-VSWR relationship diagram of the antennas on the two sets of carriers in the electronic device of FIG. 1. Referring to FIG. 7, the antenna 40 (FIG. 1) on the carrier 30 on the left side of FIG. 6 and the antenna 40 (FIG. 1) on the carrier 30 on the right side of FIG. 6 may both have VSWR equal to or below 3 in the low frequency band of 2412~2472 MHz and the high frequency band of 5150~7125 MHz, demonstrating good performance.

Figure 8:
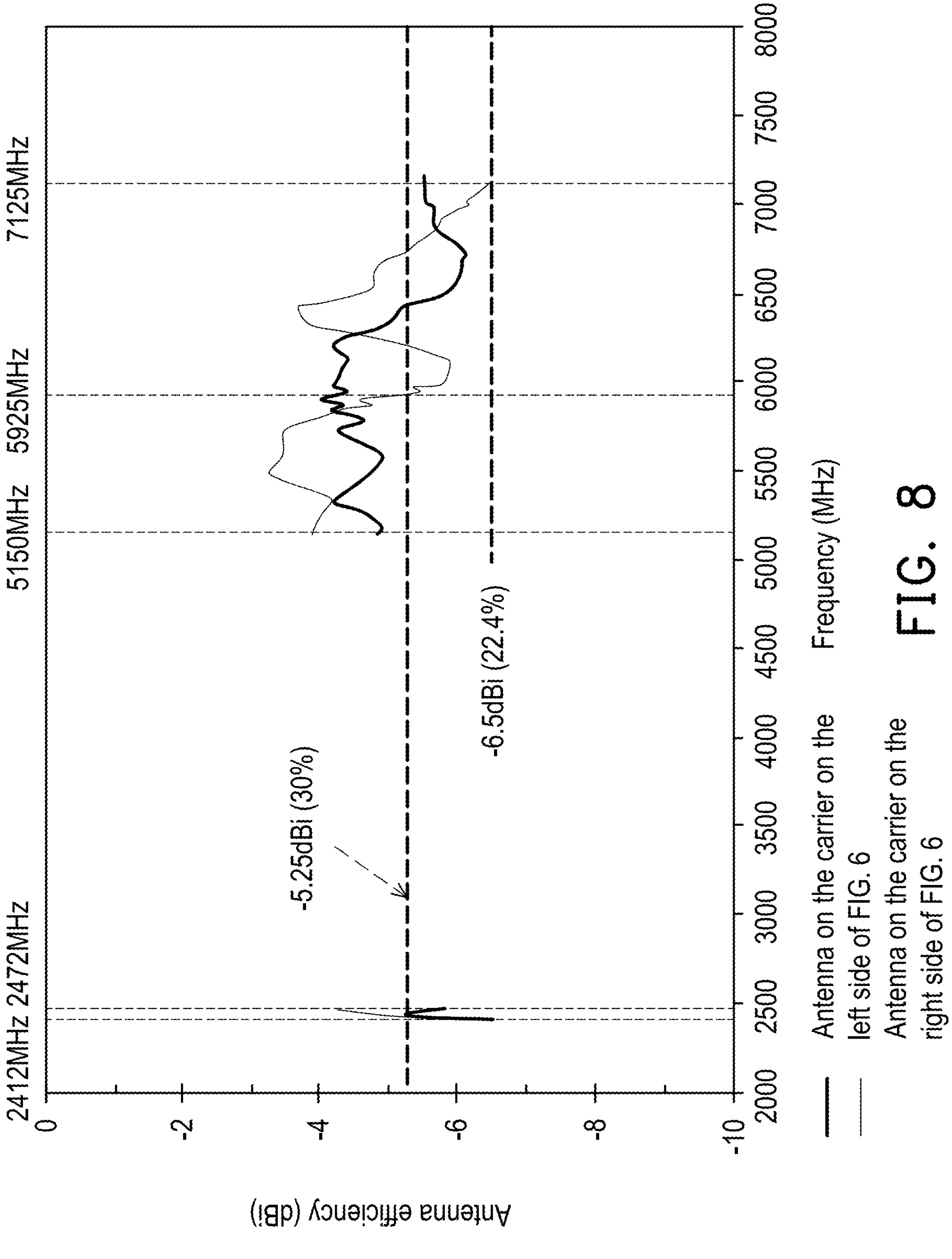
FIG. 8 is a frequency-antenna efficiency relationship diagram of the antennas on the two sets of carriers in the electronic device of FIG. 1.

FIG. 8 is a frequency-antenna efficiency relationship diagram of the antennas on the two sets of carriers in the electronic device of FIG. 1. Referring to FIG. 8, the antenna 40 on the carrier 30 on the left side of FIG. 6 and the antenna 40 on the carrier 30 on the right side of FIG. 6 have antenna efficiencies of −4.3~−6.5 dBi in the low frequency band of 2412~2472 MHz, and antenna efficiencies of −3.3~−6.5 dBi in the high frequency band of 5150~7125 MHz, possessing the characteristic of good antenna efficiency.

Figure 9:
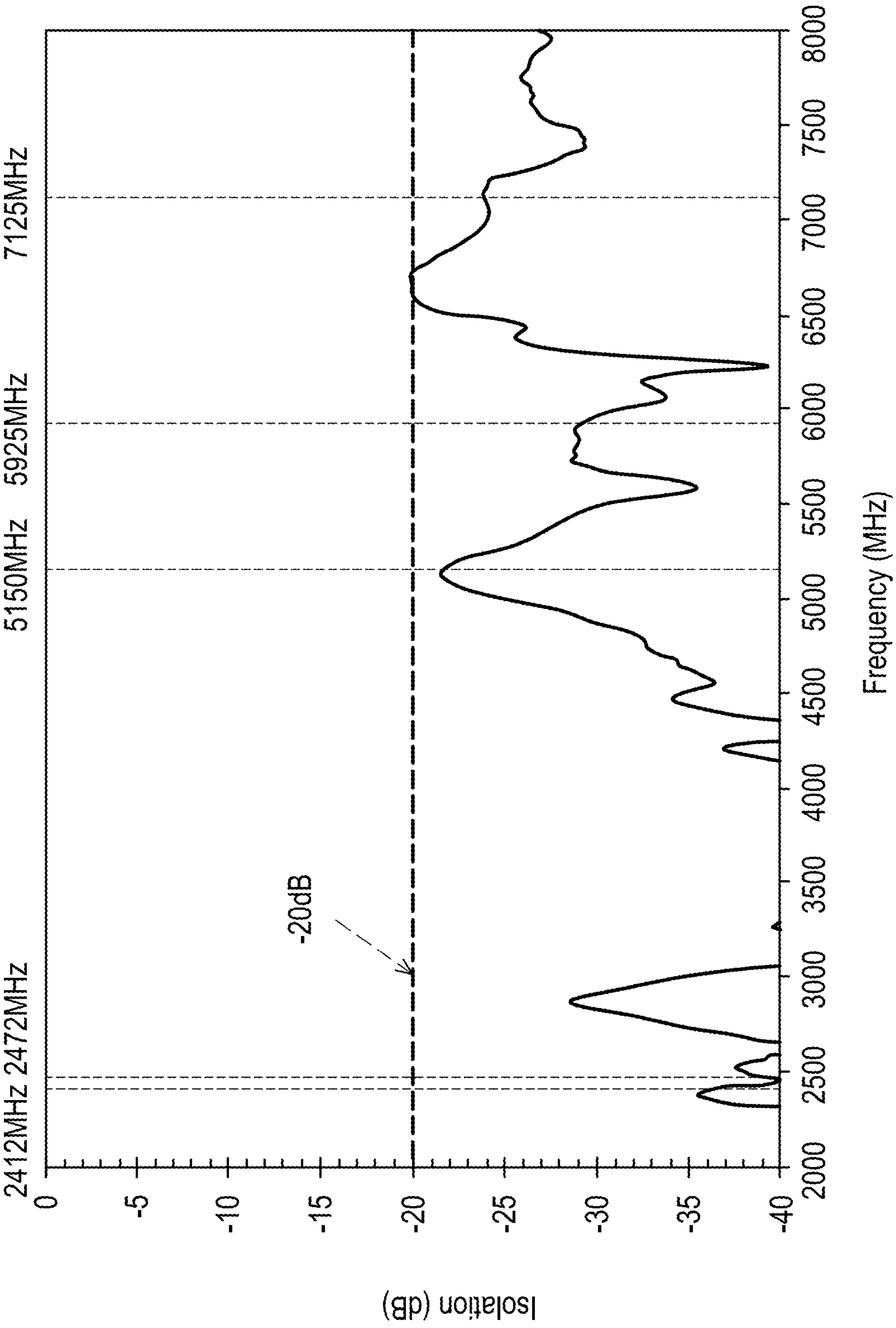
FIG. 9 is a frequency-isolation relationship diagram of the antennas on the two sets of carriers in the electronic device of FIG. 1.

FIG. 9 is a frequency-isolation relationship diagram of the antennas on the two sets of carriers in the electronic device of FIG. 1. Referring to FIG. 9, the isolation between the antenna 40 on the carrier 30 on the left side of FIG. 6 and the antenna 40 on the carrier 30 on the right side of FIG. 6 is both equal to or below −20 dB, demonstrating good isolation performance.

In summary, the first section, the second section and the third section of the fixing portion of the conductive elastic component of the electronic device of the disclosure are bent in sequence, and the first section corresponds to the third section. The fourth section, the fifth section, and the sixth section of the bent extension portion are bent in sequence, the fourth section is connected to the second section, and the sixth section bends towards the fixing portion, such that the sixth section is located between the fourth section and the fifth section. The sixth section is adapted to abut the fourth section or the second section. The conductive elastic component of the disclosure may be fixed to the carrier by at least one of the first section and the third section. The frame border area of the electronic device does not need to be provided with an additional structure for fixing the conductive elastic component, which significantly saves space in the frame border area.

What is claimed is:

1. A conductive elastic component, comprising:

a fixing portion, comprising a first section, a second section, and a third section, wherein the first section, the second section, and the third section are bent and connected in sequence, and the first section corresponds to the third section; and a bent extension portion, extending from the fixing portion, and comprising a fourth section, a fifth section, and a sixth section, wherein the fourth section, the fifth section, and the sixth section are bent and connected in sequence, the fourth section is connected to the second section, the sixth section bends towards the fixing portion, such that the sixth section is located between the fourth section and the fifth section, and the sixth section is adapted to abut the fourth section or the second section, wherein the fourth section extends in a direction away from a plane where the first section is located, the fifth section extends in a direction towards the plane where the first section is located, and a projection of the fifth section on the plane where the first section is located is outside the first section.

2. The conductive elastic component according to claim 1, wherein the bent extension portion comprises a groove located between the fourth section and the fifth section.

3. The conductive elastic component according to claim 1, wherein a width of the bent extension portion is between 0.7 millimeters (mm) and 2 mm.

4. The conductive elastic component according to claim 1, wherein one of the first section and the third section comprises a clamping section, and the clamping section bends towards the other of the first section and the third section.

5. The conductive elastic component according to claim 4, wherein a minimum distance between the clamping section and one of the first section and the third section is 0.6 mm to 0.8 mm.

6. An electronic device, comprising:

a metal frame;

a carrier, adjacent to the metal frame;

an antenna, disposed at the carrier; and at least one conductive elastic component disposed between the carrier and the metal frame, wherein the at least one conductive elastic component comprises:

a fixing portion, comprising a first section, a second section, and a third section, wherein the first section, the second section and the third section are bent and connected in sequence, and the first section corresponds to the third section; and a bent extension portion, extending from the fixing portion, and comprising a fourth section, a fifth section, and a sixth section, wherein the fourth section, the fifth section, and the sixth section are bent and connected in sequence, the fourth section is connected to the second section, the sixth section bends towards the fixing portion, such that the sixth section is located between the fourth section and the fifth section, and the sixth section is adapted to abut the fourth section or the second section, wherein at least one of the first section and the third section of the at least one conductive elastic component is fixed to the carrier, the first section or the third section contacts the antenna, and the bent extension portion connects to the metal frame, wherein the fourth section extends in a direction away from a plane where the first section is located, the fifth section extends in a direction towards the plane where the first section is located, and a projection of the fifth section on the plane where the first section is located is outside the first section.

7. The electronic device according to claim 6, wherein the at least one conductive elastic component comprises a plurality of conductive elastic components, and a distance between any two adjacent conductive elastic components among the conductive elastic components is less than 15 mm.

8. The electronic device according to claim 6, wherein one of the first section and the third section comprises a first positioning portion, and the carrier comprises a second positioning portion corresponding to the first positioning portion.

9. The electronic device according to claim 8, wherein one of the first positioning portion and the second positioning portion is a protrusion, the other of the first positioning portion and the second positioning portion is a hole, and the protrusion is adapted to be fixed in the hole.

10. The electronic device according to claim 6, wherein the bent extension portion comprises a groove located between the fourth section and the fifth section.

11. The electronic device according to claim 6, wherein a width of the bent extension portion is between 0.7 mm and 2 mm.

12. The electronic device according to claim 6, wherein one of the first section and the third section comprises a clamping section, the clamping section bends towards the other of the first section and the third section.

13. The electronic device according to claim 12, wherein a minimum distance between the clamping section and one of the first section and the third section is 0.6 mm to 0.8 mm.

* * * * *